United States Patent Office 3,529,893
Patented Sept. 22, 1970

3,529,893
PHOTOMETER WITH BRIDGE CIRCUIT
Werner A. Holle, Wetzlar, Rudolf Wilhelm Kreiling, Giessen, and Hans Dietrich Brueckner, Wetzlar, Germany, assignors to Ernst Leitz GmbH.
Filed June 22, 1966, Ser. No. 559,472
Claims priority, application Germany, July 1, 1965, L 51,015
Int. Cl. G01j 1/42, 1/52
U.S. Cl. 356—222    5 Claims

ABSTRACT OF THE DISCLOSURE

An exposure measuring device having two photoelectric resistors in a bridge circuit. Two ohmic resistors of the two bridge branches are combined to form a potentiometer and further the two photoelectric resistors in combination with at least one ohmic resistor are positioned in the same or in adjacent bridge branches.

The elements are of suitable electrical value to achieve a linear pointer deflection of the measuring system, even if a potentiometer with a linear resistance characteristic is employed in the bridge circuit.

---

This invention relates to photometers or lightmeters and more particularly to photometer bridge circuits.

In addition to known photo-electric cells which supply an electromotive force that is dependent upon the intensity of the light impinging thereupon, photoresistors are also employed for measuring exposure times; and it is possible to use therewith some of the circuit arrangements known from the general technique for measuring electrical resistances.

Thus, it is known to measure the resistance values of a photoresistor in relation to the light which impinges thereupon by means of a Wheatstone bridge circuit.

A device has been previously described for example, which uses two photoresistors positioned in different non-adjacent branches of a bridge circuit of this type. It is also known from this literature source to use as a branch resistance a photoresistor to which parallel and series resistors are added as trimmer resistors.

It is further known to position two photoresistors in the same branch of a Wheatstone bridge. It is also no longer new due to the present invention to connect two photoresistors, which are equal with respect to each other, into different adjacent branches of a bridge.

The use of an adjustable diaphragm either alone or in combination with trimmer resistances in order to influence the operating range of a photoresistor is also known.

In addition thereto, a photometer is known in the art as shown by German Pat. 1,070,843 which contains a bridge circuit with a photoresistor as a branch resistor characteristic of the bridge potentiometer and in which the step rate of changes of the variable resistance is set up in stages in an S-shaped manner. The calculation of the various stages of this resistance was based upon the known resistance characteristic of a photoresistance (resistance as a function of the luminous intensity. The stages of the variable resistor were designed so that changes in light intensity would be linearly proportional to displacements of the resistor's slidable contact. Linearity is produced by employing a potentiometer having a non-uniform resistance characteristic which compensates for the non-linearity of the commercial photoresistor.

This arrangement has the disadvantage that the potentiometer must be made as a step resistance which involves considerable expenditure due to the special manufacture required.

Since the variable resistance may comprise only a limited number of partial resistances and the value of intensity of incident light may reach continuously all possible values in a measured range, an inevitable error is introduced in the measurement, because only a stepwise measurement is possible with this arrangement. In addition, a mistuning of the bridge circuit caused by an increment in light intensity of, for example, ±1 light value (where 1 L means a change of light by a factor of 2 as customarily used in lightmeters, see for example, U.S. Pat. 3,218,917 to Foersterling et al.) produces incremental currents in the diagonal branch which differ from each other depending on the location of the light intensity within the measuring range of intensities.

The present invetnion has the object of providing arrangements which eliminate the disadvantages mentioned hereinabove, which comprise known conventional structural parts with which continuous measurements may be carried out and in which the zero indicator in the diagonal branch may receive, in addition to the zero mark, markings or identifications for specific light variations.

The present invention starts out from the basic concept that a voltage divider comprising a photoresistance and an ohmic resistance in series has an S-shaped characteristic of the voltage divider ratio (i.e. the ratio of one of the resistances to the total resistance of the two series connected resistors). Since a linear scale indication for the light values is desirable, the S-shaped voltage characteristic of the divider is reproduced or simulated in the known art by using a correspondingly graduated potentiometer having an S-shaped resistance characteristic so that the indication is linearized. The S-shaped distortion of the voltage characteristic, increases with an increase in the slope exponent of the photoresistances being employed. As described in the Journal of the Optical Society of America, vol. 50, No. 1, p. 40, January 1960, the exponent $n$ is characteristic of individual photoresistors and obeys the following relationship: $R=k/E^n$, where R is the resistance of the photoresistor at illumination intensity E, and $k$ is a proportionality constant. With sufficiently small exponents it would be possible to avoid specific linearizing measures at the periphery of a predetermined measuring range by using only the linear central part of the S-curve. For a range of light intensities of for example, 14 light values, slope or inclination exponent of the photoresistance would have to be smaller than 0.3. Such photoresistances, however, cannot as yet be mass-produced at the present time if they are to satisfy simultaneously the other requirements to be met by photoresistors. The present invention has therefore the specific object of developing voltage divider circuits comprising commerical photoresistances and ohmic resistances whose voltage dividing characteristic is linearized in the center of the light intensity measuring range to avoid the S-curve characteristic produced in the past by dividers comprising a photoresistor and an ohmic resistor.

A voltage divider of this type may be obtained, in accordance with the present invention, by placing one photoresistor in each part of the voltage divider. The two photoresistors should have the same resistance values as the same luminous intensities. The resistance characteristics of these two photoresistances are represented in FIG. 4, wherein resistance is plotted in logarithmic scale against the light values (i.e., as a function of the logarithm of the intensity of illumination). The two coinciding straight lines A and B represent two photoresistors having equal photoresistance, A=B. Connected in series, the resulting voltage divider would have a constant dividing ratio of $$P = \frac{A}{A+B}$$

or ½. In the center of the measuring range the two photoresistors have the resistance $r_o$. If to one of the photoresistors an ohmic resistor with resistance $d \cdot r_o$ is added in parallel and an ohmic resistor with resistance $r_o/d$ is added in series, where $d$ is an optional number factor, the the curve B' is obtained as the resistance characteristic of that resistor combination. At the center of the measuring range, the curve B' approximates the characteristics of B and A, while tending toward the ends of the range to the fixed values $d \cdot r_o$ and $r_o/d$ respectively. The curves A and B obey the above mentioned equation $R = k/E^n$, or $$R/r_o = (E_o/E)^n$$

where $r_o$ is the photoresistance produced at intensity $E_o$. Since one light value has been defined as change of light by a factor of 2, L may be represented as $$L = \mathrm{Log}\, 2 \frac{E}{E_0}$$

Substituting and solving for $R/r_o$, it follows that $$R/r_o = 2^{-nL}$$

when the light value is counted from the center of the measuring range. Letting $2^{-nL} = r$ and $A = B = R = r_o \cdot r$, the combination of photoresistance B with the series resistance $r_o/d$ and the parallel resistance $r_o \cdot d$ may be shown by elementary resistance theory to be $$B' = r_0 \frac{rd^2 + d}{rd + d^2 + 1}$$

It follows that the voltage divider ratio $$p = \frac{B'}{A + B'}$$

for the photoresistance groups A and B1 is $$P = \frac{d + rd^2}{d + 2rd^2 + r + r^2 d}$$

By calculations with different values of the factor $d$, it can be demonstrated that one obtains with $d \approx 3$ to 5 an optimum of linearity of the voltage dividing characteristic of P within a large range of $nL$. Therefore, for a given exponent $n$, characteristic of the photoresistors used, an adequate range of light values L is obtained, in which a nearly linear change of voltages will be observed.

Analogously, it can be shown that, when both photoresistors are positioned together in one bridge branch, with the two photoresistors having a resistance ratio of $1:d^2$ for all luminous intensities, and an ohmic resistor is coordinated to the photoresistors whose resistance value corresponds to the geometrical mean measuring range, and when a balancing resistor whose resistance is likewise made equal to the aforementioned geometrical mean is positioned in the adjacent bridge circuit, a voltage divider ratio P will be produced which likewise follows the above mentioned formula. Accordingly, an optimum of linearity for the dividing ratio of these two photoresistors of the already discussed voltage divider results, if the magnitude $d^2$ is chosen approximately between 9 and 25.

The present invention is therefore directed or photometers or lightmeters comprising bridge circuits or connections in which two photoresistors are employed, in which the resistors of two bridge branches are combined as one linear potentiometer, and which have a quasi-linear division of the light value scales thereof. According to the present invention, the two photoresistors may be positioned together in the same bridge branch and the resistance ratio thereof may be from 1:6 to 1:36. Associated with the photoresistors is an ohmic resistor whose resistance value corresponds to the geometrical mean of the resistance values of the two photoresistors within the mean or central measuring range.

According to a further embodiment of the present invention, the two photoresistors may, however, also be identical and may be positioned in different adjacent branches of the bridge. In this case, at least one ohmic resistor is connected in series and at least one ohmic resistor is connected in parallel to one of them; and the resistance value of the parallel resistor and/or resistors is 2.5 to 6 times greater, while the resistance value of the series resistor and/or resistors is 2.5 to 6 times smaller than the resistance value of the photoresistors in the center of the measuring range. Moreover, the measuring device, positioned in the diagonal branch of the bridge, may be provided in a high-ohmic manner; this has the advantage that, due to the linear characteristic of the voltage divider ratio in the bridge, the scale of the measuring device may be calibrated in light value deviations or variations, which may be used to introduce correction factors.

These and other objects, advantages, and features of the invention and the manner in which the same are accomplished will become more readily apparent upon consideration of the following detailed description of the invention when taken in conjunction with the accompanying drawings, which illustrate preferred and exemplary embodiments, and wherein.

Figure 1A:
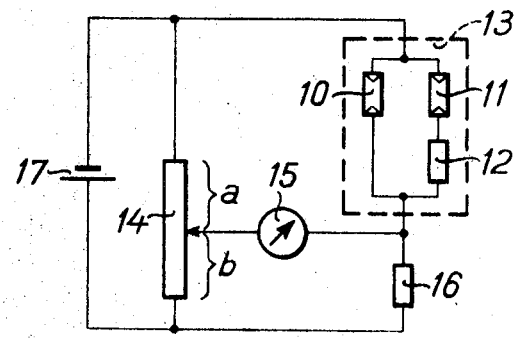
FIG. 1a is a schematic circuit diagram of a first embodiment of the invention.

FIG. 1 illustrates an arrangement in which two photoresistances, a first 10 and a second 11 are connected in parallel with respect to one another, the second photoresistor being positioned in series with an ohmic resistor 12 to constitute a whole branch resistor 13 in a bridge. Two additional arms of the bridge comprise a potentiometer 14, which displays a linear resistance characteristic. The bridge is completed by a fourth resistor arm 16 and a battery 17 across one diagonal branch. The resistance values of the two photoresistances have a ratio of from 1:6 to 1:36; in other words, the resistance value of the photoresistor 10 is from 6 to 36 times greater than that of the photoresistor 11. If, in this circuit, a highly ohmic measuring device or system 15 is positioned within the other diagonal branch, a specific deflection of the measuring system pointer or indicator corresponds to a variation of the illumination in light value, which remains the same over the entire measuring range. For example, an increase of 12° of the angle of deflection corresponds to a light value change of two units, independently of the indicator or pointer position, i.e. the light value, which is used at the start. In this case, one light value is defined by a change of the luminous intensity by the factor two.

Figure 1B:
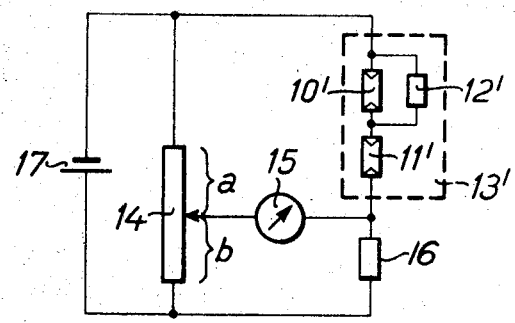
FIG. 1b is a schematic circuit diagram of a second embodiment of the invention.

FIG. 1b illustrates a similar arrangement in which the two photoresistances 10', 11' are positioned in series and in which the more highly ohmic one 10' thereof is bridged by a resistance 12' parallel. These resistances again form a third branch resistance 13' of a bridge which is otherwise the same as in FIG. 1a.

As is well known in the art, an ohmmeter or resistance measuring device constructed as a bridge circuit is largely independent of the magnitude of the feeding voltage for the bridge circuit. However, the precise voltage of the feeding source becomes important when, instead of balancing or tuning the circuit to zero deflection, the extent of unbalance registered by the measuring device is used to introduce correction factors which may be used for the measurement of exposure time, for example. Accordingly, means for checking the battery voltage must be provided.

Figure 2:
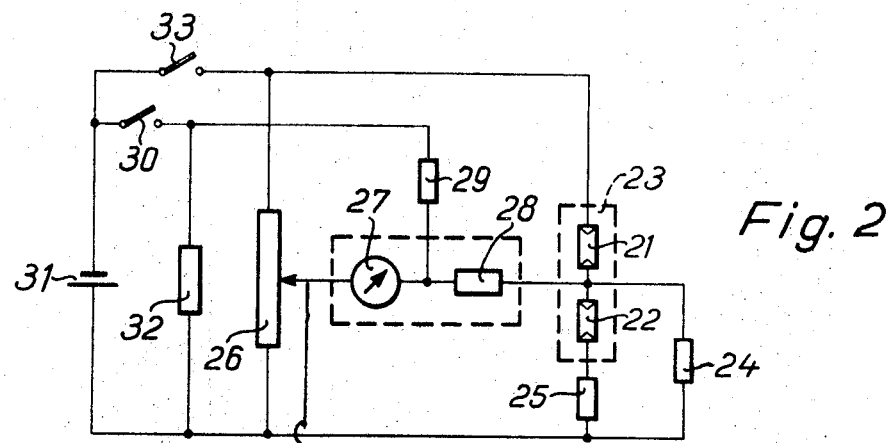
FIG. 2 is a schematic circuit diagram of a third embodiment of the invention.

FIG. 2 shows a corresponding arrangement in which two photoresistors 21 and 22, which are identical with respect to each other and which are parts of a double photoresistor 23, are positioned in different adjacent branches of a bridge circuit. A second resistor 24 is connected in parallel and a first resistor 25 is connected in series with the photoresistor 22. The resistor 24 is so proportioned with respect to the resistance value thereof that it is 2.5 to 6 times larger than the resistance value of one of the photoresistors in the center of the measuring range, for instance at the light value 8. The resistor 25 is proportioned smaller by the same factor than the resistance value of one of the photoresistors in the center of the measuring range. The bridge circuit further comprises a linear potentiometer 26. The measuring device, which is positioned in the diagonal branch, consists of the measuring system 27 as well as a high-ohmic series or additional resistor 28. The connecting point of these two structural parts may be linked to the supplying source 31 by way of a resistor 29 as well as a switch 30. The switch 30 also allows a load impedance 32 to be positioned directly in parallel to the source 31. The measuring bridge may be positioned or placed across the voltage by way of a switch 33. The switch 33 acts as the operating switch, while the switch 30 acts as a test switch for the battery voltage which can be checked by means of the existing measuring system. The switches are so coupled to each other respectively that they cannot be actuated at the same time.

Figure 3:
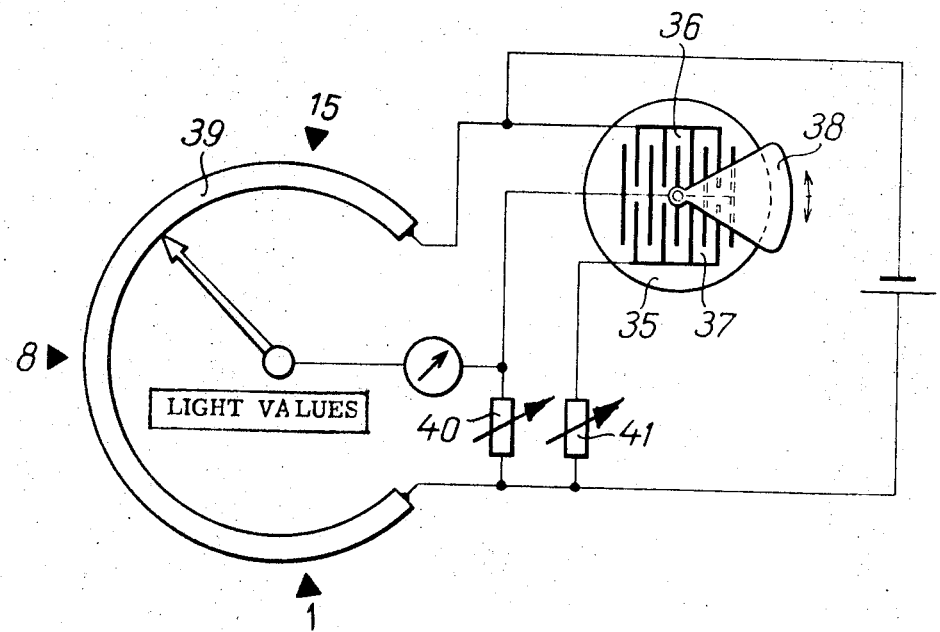
FIG. 3 is a schematic circuit diagram of a fourth embodiment of the invention.
Figure 4:
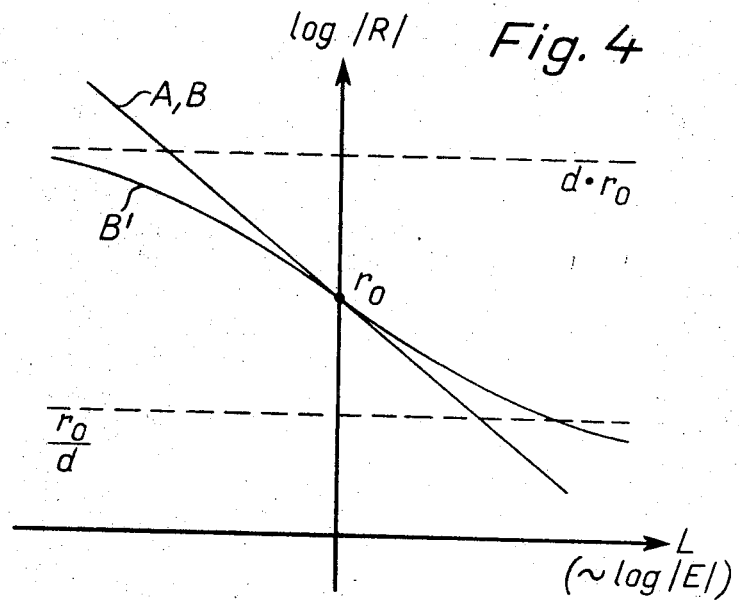
FIG. 4 is a graph showing certain characteristics of the invention.

FIG. 3 illustrates a bridge circuit with two identical photoresistances 36 and 37 constituting parts of a photoresistance 35, to which a rotatable diaphragm 38 is added for adjusting purposes. The potentiometer 39 comprises markings or identifications for the light values among which only the light values 1, 8 and 15 have been indicated as initial, central and end positions for the potentiometer pick-up or wiper. A trimmer resistance 40 is connected in parallel, and a trimmer resistance 41 is connected in series with the photoresistance 37. In this circuit it is possible to effect a three-point balancing or tuning in that balancing is effected when the position of the potentiometer slider corresponds to the mark for the light value 8 by rotating the diaphragm 38, in that the balancing or tuning for the light value 1 is subsequently effected by trimming the resistance 40, and in that the balancing or tuning for the light value 15 is effected by trimming the resistance 41.

It should also be mentioned that the body of the potentiometer may be rotatably positioned for purposes of adjustment.

The invention claimed is:

1. A lightmeter bridge circuit comprising the following elements:
    (a) a potentiometer with a movable contact wiper, the resistance characteristic of said potentiometer bearing a linear relationship to the displacement indicated by the position of said contact wiper in relation to a fixed reference point, the position of said movable contact wiper dividing said potentiometer into two portions, one of said two portions lying in a first arm of said bridge circuit and the other lying in an adjacent second arm of said bridge circuit, said potentiometer forming in effect two series connected resistances;
    (b) two photoresistors having substantially identical relationships of resistance to light intensity over a predetermined measuring range of light intensities, one of said two photoresistors lying in a third arm of said bridge circuit and the other lying in an adjacent fourth arm of said bridge circuit, said two photoresistors forming two series connected photoresistances;
    (c) a measuring device one terminal of which is connected to said contact wiper and another terminal of which is connected to the point of connection between said two photoresistors, said measuring device being capable of indicating an absence of potential difference between said contact wiper and said point of connection between said two photoresistors, whereby said measuring device forms the diagonal arm of said bridge circuit;
    (d) a D-C source connected in parallel with said potentiometer, said source being connected to the ends of said potentiometer, said source feeding said bridge circuit; one of the ends of said potentiometer being further connected to said third arm and the other end being connected to said fourth arm;
    (e) at least on ohmic resistor added in series to one of said two photoresistors and at least one ohmic resistor added in parallel to the same photoresistor, said at least one ohmic resistor added in parallel having an ohmic resistance from about 2.5 to about 6 times greated than the mid-range photoresistance being that resistance which one of said two photoresistors exhibits when exposed to light the intensity of which corresponds to the center of said measuring range of light intensities, said at least one ohmic resistor added in series having an ohmic resistance from about 2.5 to about 6 times smaller than said mid-range photoresistance;
    (f) a linear relationship being established between changes in light intensity within said measuring range and the corresponding displacements indicated by said contact wiper.

2. A lightmeter as claimed in claim 1 further comprising optical means for aligning the resistances of said two photoresistors.

3. A lightmeter as claimed in claim 2, said optical means comprising an adjustable diaphragm partially covering at least one of said two photoresistors.

4. A lightmeter as claimed in claim 1, the body of said potentiometer being rotatable for calibration.

5. A lightmeter as claimed in claim 1, further comprising switching means, one end of said switching means being connected to said D-C source, and the other end being connected both to said diagonal arm and to a load resistor in parallel with at least one said portion of said potentiometer, whereby the voltage of said source may be measured.

References Cited

UNITED STATES PATENTS

| 2,848,684 | 8/1958 | Tuppin | 324—98 X |
| 2,972,282 | 2/1961 | Foersterling et al. | 88—23 GX |
| 3,218,917 | 11/1965 | Foersterling et al. | |
| 3,247,387 | 4/1966 | Doubek et al. | 250—210 |
| 3,286,097 | 11/1966 | Norwood | 250—209 |
| 3,379,094 | 4/1968 | Bertram. | |
| 2,233,879 | 3/1941 | Tolman | 356—226 |
| 3,225,646 | 12/1965 | Nagai | 356—222 |

FOREIGN PATENTS

| 1,169,154 | 4/1964 | Germany. |
| 481,926 | 6/1953 | Italy. |

OTHER REFERENCES

Shwikus, "Colorimetry," Radio News, June 1944, pp. 25–27, 56, 58, 60.

RONALD L. WIBERT, Primary Examiner

R. J. WEBSTER, Assistant Examiner

U.S. Cl. X.R.

95—64, 100; 250—210; 356—218, 224